United States Patent
Jenkins et al.

(10) Patent No.: US 7,116,986 B2
(45) Date of Patent: Oct. 3, 2006

(54) SYSTEM AND METHOD FOR PROVIDING SECURE COMMUNICATION BETWEEN NETWORK NODES

(75) Inventors: Daniel Collin Jenkins, Pomona, CA (US); Timothy Ronald Jackson, Yorba Linda, CA (US); Peter Joseph Maimone, Irvine, CA (US)

(73) Assignee: u-Nav Microelectronics Corporation, Irvine, CA (US)

( * ) Notice: Subject to any disclaimer, the term of this patent is extended or adjusted under 35 U.S.C. 154(b) by 90 days.

(21) Appl. No.: 10/724,323

(22) Filed: Nov. 26, 2003

(65) Prior Publication Data

US 2004/0166875 A1    Aug. 26, 2004

Related U.S. Application Data

(60) Provisional application No. 60/429,866, filed on Nov. 27, 2002.

(51) Int. Cl.
| | |
|---|---|
| H04Q 7/20 | (2006.01) |
| H04Q 11/00 | (2006.01) |
| H04Q 7/00 | (2006.01) |
| H04B 17/00 | (2006.01) |

(52) U.S. Cl. .............................. 455/456.1; 455/67.11; 455/562; 370/265; 370/329; 370/310

(58) Field of Classification Search ............. 455/456.1, 455/428, 435.1, 562.1, 522, 255, 436, 574, 455/67.16, 450, 41.2, 67.11, 562; 370/265
See application file for complete search history.

(56) References Cited

U.S. PATENT DOCUMENTS

| | | | | |
|---|---|---|---|---|
| 5,592,490 A | * | 1/1997 | Barratt et al. | 370/310 |
| 5,678,184 A | * | 10/1997 | Cutler et al. | 455/436 |
| 5,886,988 A | * | 3/1999 | Yun et al. | 370/329 |
| 6,141,570 A | * | 10/2000 | O'Neill et al. | 455/574 |
| 6,308,081 B1 | * | 10/2001 | Kolmonen | 455/522 |
| 6,317,612 B1 | * | 11/2001 | Farsakh | 455/67.11 |
| 6,597,668 B1 | * | 7/2003 | Schafer et al. | 370/280 |
| 6,678,253 B1 | * | 1/2004 | Heath et al. | 370/265 |
| 6,704,547 B1 | * | 3/2004 | Kuwahara et al. | 455/67.16 |
| 6,748,202 B1 | * | 6/2004 | Syrjarinne et al. | 455/255 |
| 6,947,880 B1 | * | 9/2005 | Johnson et al. | 703/2 |
| 2003/0073406 A1 | * | 4/2003 | Benjamin et al. | 455/41 |
| 2003/0087673 A1 | * | 5/2003 | Walton et al. | 455/562 |
| 2003/0153318 A2 | * | 8/2003 | Wong et al. | 455/450 |
| 2004/0198378 A1 | * | 10/2004 | Hay | 455/456.1 |

* cited by examiner

*Primary Examiner*—William Trost
*Assistant Examiner*—Kiet Doan
(74) *Attorney, Agent, or Firm*—Gates & Cooper LLP

(57) ABSTRACT

A network, network device and method is disclosed. A network of network nodes is disclosed in which the network nodes securely transmit communication signals using one or more spatial parameters unique to the network nodes. A data positioning device capable of operating as a node in a network of the present invention is also disclosed.

37 Claims, 10 Drawing Sheets

FIG. 2A1

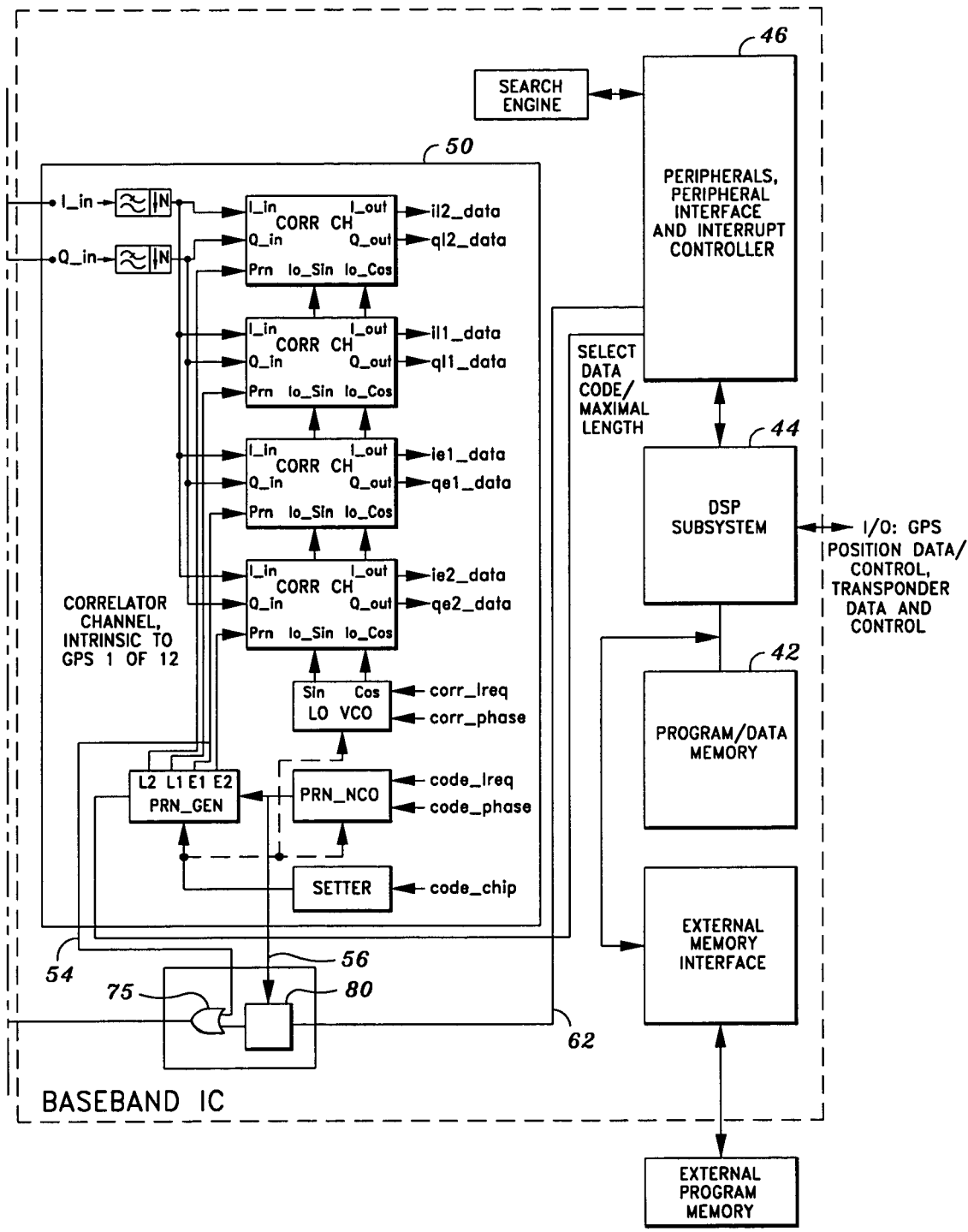
FIG. 2A2

FIG. 2B1
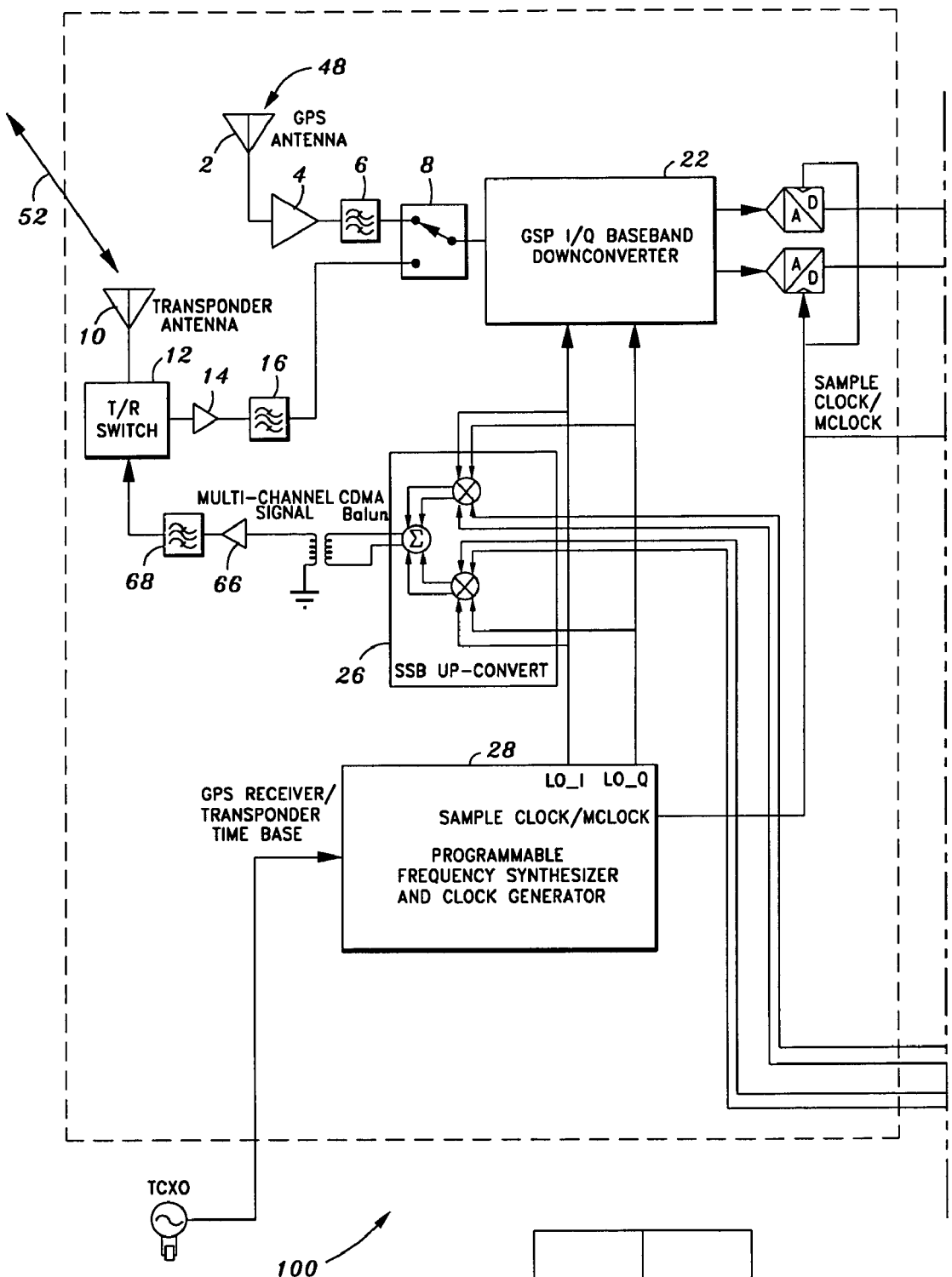
FIG. 2B
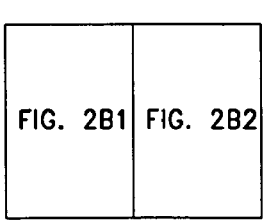

FIG. 2B2
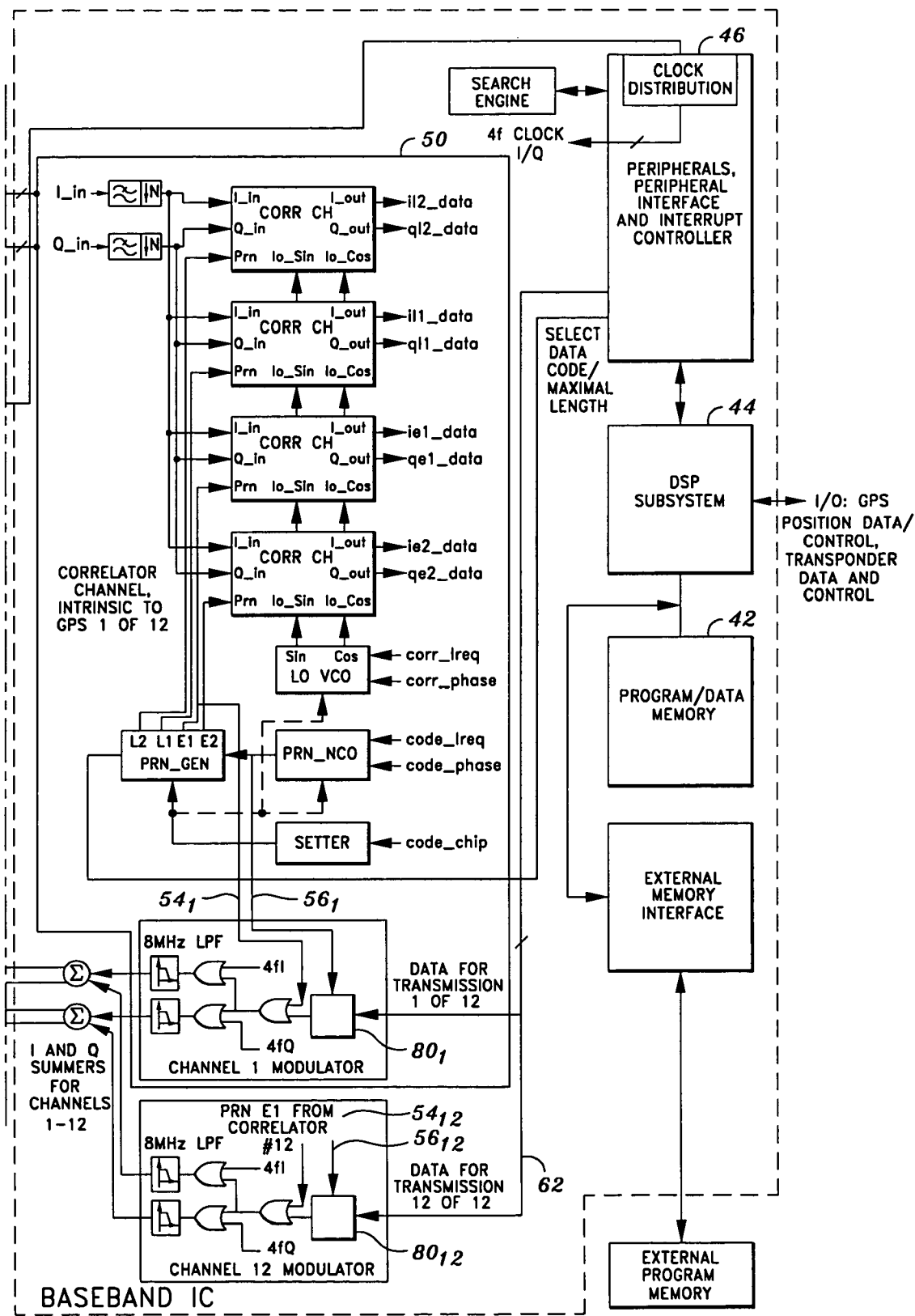

SYSTEM AND METHOD FOR PROVIDING SECURE COMMUNICATION BETWEEN NETWORK NODES

CROSS REFERENCE TO RELATED APPLICATIONS

This application is related to and claims priority from provisional application Ser. No. 60/429,866, entitled "System and Method of Utilizing Positioning Receiver Hardware for Network-Based Transceiver Applications," filed on Nov. 27, 2002.

BACKGROUND OF THE INVENTION

1. Field of the Invention

The present invention relates in general to data networks, and more particularly to a networked navigation-enabled system that provides secure communication between network nodes.

2. Related Art

While the development of navigation technology is a rapidly growing industry, the value of being able to remotely obtain precise position information has long been recognized. Numerous navigation applications have recently been recognized and systems relating thereto developed, with the result being that navigation technology has found its way into cars, boats, planes, construction equipment, farm machinery and cellular phones.

One of the most well developed navigation system is the global positioning system (GPS). In fact, GPS technology has matured to the point that virtually everyone, including scientists, sportsmen, farmers, soldiers, pilots, surveyors, hikers, delivery drivers, sailors, dispatchers, lumberjacks and fire-fighters can benefit from it. Various applications in which GPS has been used include location, navigation, tracking, mapping and timing.

Recently, the idea of network-assisted GPS systems has been introduced. However, these systems have only scratched the surface of the applications that are possible by combining GPS technology with the full functionality of network communications. Thus, there is a need in the art for a fully-networked navigation-enabled system. In addition to the numerous possible applications in which a fully-networked navigation-enabled system may be used, there is a further need in the art for positioning receiver hardware for network-based transceiver applications that make use of navigation technology, such as GPS.

BRIEF SUMMARY OF THE INVENTION

A network, network device and method is disclosed. In one embodiment a network comprises a first network node and a second network node to wirelessly communication with the first network node. In one embodiment, the first network node securely transmits communication signals to the second network node using one or more spatial parameters unique to the second network node.

BRIEF DESCRIPTION OF THE DRAWINGS

FIG. 2b is a schematic diagram of yet another embodiment of a transponder consistent with the principles of the invention.

DETAILED DESCRIPTION OF THE EMBODIMENTS

Figures 1, 1A:
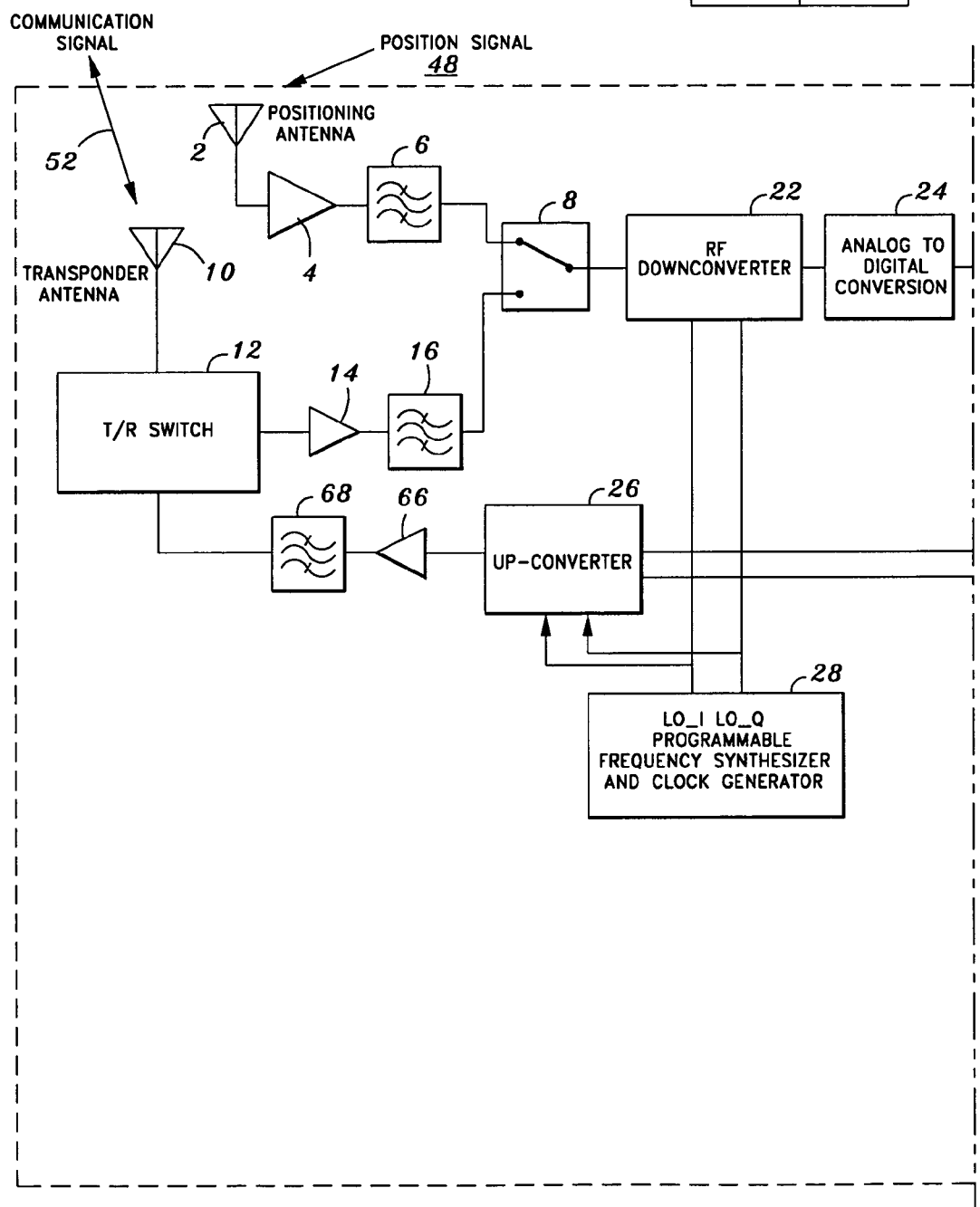
FIG. 1 is a schematic diagram of one embodiment of a transponder consistent with the principles of the invention.
Figure 1B:
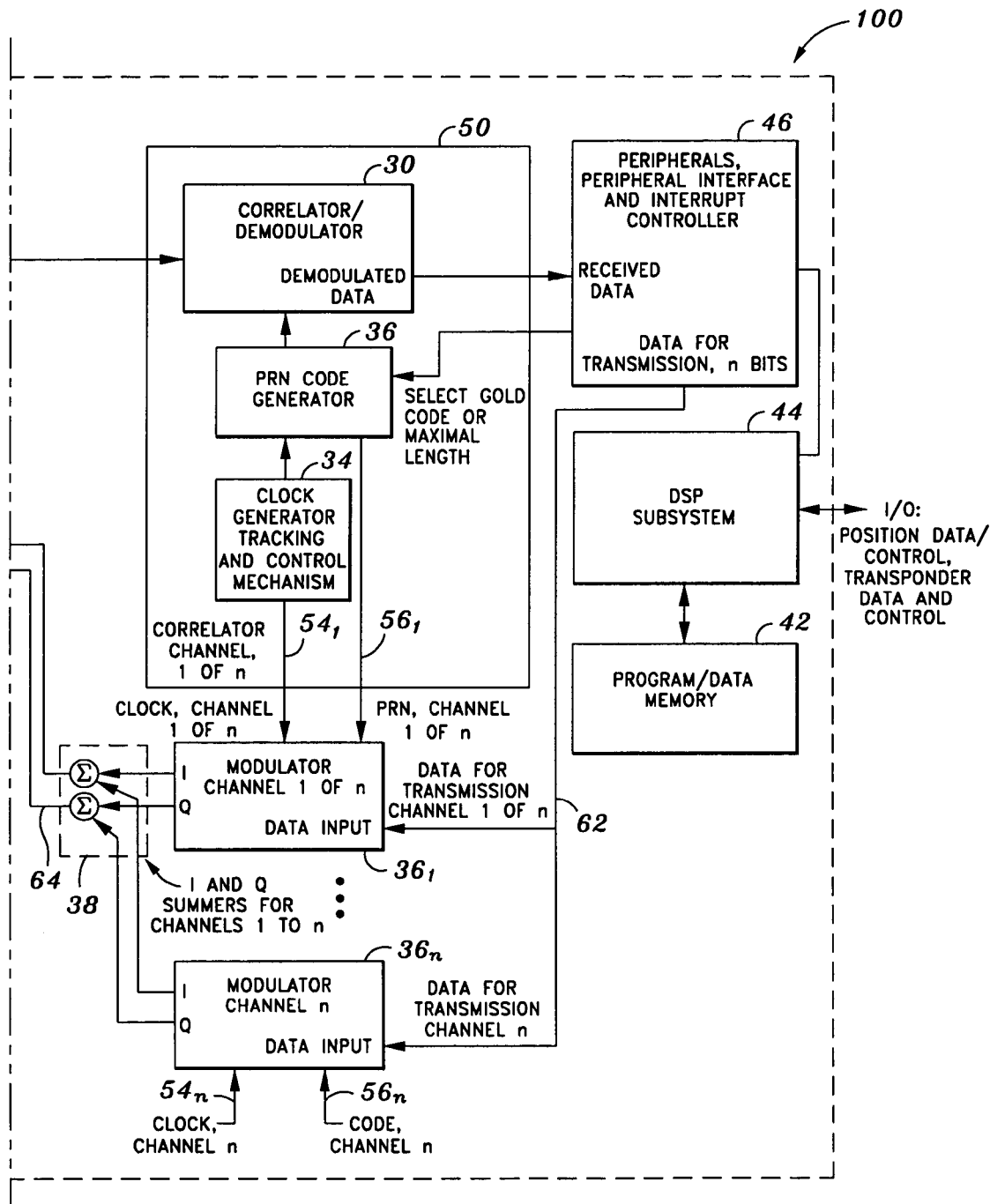

One aspect of the invention is to provide a network of data devices having data representations of connectivity, network node position, and/or position topologies. In one embodiment, the data devices are nodes of the network and have the ability to share data with each other, as well as data from other sources connected to any of the network nodes. In yet another embodiment, a database of network topology is distributed among the networked data devices such that changes in the network state would be incorporated into that distributed topological data representation.

In one embodiment, network nodes are addressable in terms of device identification, connectivity topology and/or according to spatial parameters. Such spatial parameters may include position, velocity and/or other parameters associated with dynamic or static behavior. Addressing of the network nodes (which in one embodiment are data devices) would enable communications of data and control information to only the desired recipients separable by one or all of the parameters defining the network topology characteristic.

One application of having spatially addressable network nodes is the ability to define a method for secure communication. In one embodiment, communications between network nodes may be encrypted based upon positional data, device ID or motional parameters increasing the difficulty of deriving information from the message. In another embodiment, positioning signal qualities that enable a PVT (position, velocity, time) calculation to be made may be used in an encryption scheme. For example, it is possible to reuse positioning signals (or portions thereof) to generate a new signal that can be correlated and therefore demodulated only by the recipient in the intended position space. This spatial-correlation quality would enable a reciprocal communication link to be established between one or more qualified spaces, thereby diminishing the ability of the communication to be compromised by those outside the intended qualified spaces. Similarly, in another embodiment, the timing precision and synchronicity enjoyed by the network may be used in traditional secure communications techniques, such as direct sequence spread spectrum ("DSSS") or time hop spread spectrum.

Another aspect of the invention is to provide a self-configuring network. In one embodiment, the network can self-configure to add or remove network nodes on a connectivity basis. New nodes (e.g., data devices) not previously on the network can join by protocol sharing with the network after the connection is made, according to one embodiment. Similarly, the network may change the status of a node no longer connected to an inactive status. In yet another embodiment, the last known parameters for a removed node are distributively stored after criteria for disconnection is met.

Another aspect of the invention is to provide a data positioning device capable of operating as a node in a network of the present invention. In one embodiment, the data device is a radio frequency device having integrated into it means for wireless communication, remote control and/or encrypted communication for use in a network as described above. In yet another embodiment, the data device is a portable low cost and low power device capable of receiving signals from navigation beacon transmitters and sensing environmental characteristics for calculation of position and dynamic behavior. Moreover, the data device may further be capable of relaying that position and motion information to another device via a communications link, which may or may not be part of the network of data devices.

As mentioned above, one aspect of the invention is to combine transponder and receiver functionality. In the case of a direct sequence spread spectrum ("DSSS") positioning receiver, given the fact that DSSS is based upon the reciprocal properties of modulo-2 addition, much of the receiver hardware may be shared with transmitter applications. Since DSSS modulation and demodulation are reciprocal processes, the bi-phase modulation of the carrier wave in a transmitter consists of multiplying the pseudo-random noise (PRN) sequence with the carrier wave. If we can multiply that bi-phase modulated waveform with a synchronized, identical PRN sequence, it is possible to duplicate the original carrier wave. Conversely, if we multiply the bi-phase modulated waveform with the original carrier wave, we get the original PRN sequence as the result. These reciprocity characteristics lead us to the conclusion that the locally-generated code can be used to "correlate" with the received bi-phase modulated code and yield a resultant carrier wave representation. So, in effect, the local code generator in a receiver is identical to the associated transmitter code generator and therefore may be used as a transmitter code generator itself.

In general, the sensitivity of a receiver is inversely proportional to the bandwidth of that receiver, reaching a sensitivity maximum at the matched filter bandwidth and then degrading with increasingly narrow filters. As a result, the time it takes to find a signal is inversely proportional to the signal level and proportional to the frequency uncertainty which sets the number of searches for the signal in the frequency domain. Providing precise signal frequency assistance and signal phase assistance reduces the number of signal search operations necessary to find the signal, which promotes prompt position determination in signal-impaired conditions where the mandated narrow bandwidths result in longer detection times. Thus, another aspect of the invention is to provide signal-based assistance information to increase the ability of the data positioning device to find attenuated positioning signals using the characteristics of the data signal itself.

In one embodiment, the network design enables the network communications signals to be used as substitutes for the network node position signals (e.g., navigation beacon signals). Substitution for the network node position signals requires that the communication signals have the same essential characteristics required of the network node position signals to facilitate position calculations to be performed.

As will be described in greater detail below, where the network nodes are navigation beacons, the positioning network may require a system of equations derived from signals containing exact time, frequency and time-tagged beacon position information. The beacons of such a positioning network may transmit signals with ranging properties that enable signal phase to be distinguished against universal precise time in the receiver, thereby yielding the range from each beacon to the receiver by factoring the speed of light into the calculus.

Since the proposed positioning network nodes are able to substitute for missing navigation beacon signals, they will also have the essential characteristics for position calculation. Those signal characteristics may be representative of the assistance information that may be sent to the positioning receiver. In one embodiment, the communications signals are essentially a function of the navigation beacon signal, with the frequency having a known relationship to the associated navigation beacon signal, and the communications signal PRN being a known function of the navigation beacon signal PRN. As a result, a positioning transponder could derive information for finding weak signals from a substantially stronger network communications link signal without requiring that the information be modulated onto the signal as data. Thus, in one embodiment the positioning network may have unique intrinsic assistance information designed into its signals.

Referring now to the figures, FIG. 1 illustrates one embodiment of an integrated transmitter/receiver unit consistent with the principles of the invention, which would enable continuous half-duplex communications and positioning. In particular, FIG. 1 depicts a twelve-channel positioning transponder 100 capable of receiving the position signals 48 by way of positioning antenna 2. In the embodiment of FIG. 1, the positioning signals 48 are comprised of twelve CDMA (Code Division Multiple Access) positioning signals or CDMA communication channels.

In one embodiment, the position signals 48 may be comprised of one or more navigation beacon signals, as required for receiver position determination. While in one embodiment, the position signals 48 is generated from DSSS beacons, it should be appreciated that the position signals 48 may be provided by any navigation system beacon capable of providing positioning information.

Once received, the position signals 48 may be amplified by amplifier 4, which in one embodiment is a low-noise amplifier. Thereafter, filter 6 may used to extract the components of the signal 48 at a desired frequency or range of frequencies. In one embodiment, filter 6 is a band-pass filter. It should further be appreciated that other methods of signal processing may be used.

Regardless of the front-end signal processing employed, switch 8 is used to select the signal from either positioning antenna 2 or transponder antenna 10. When switch 8 is set to accept the position signals 48, RF downconverter 22 may be used to down-convert the signal 48. In one embodiment, RF downconverter is an RF to IF converter. Next, an Analog to Digital Converter (ADC) 24 converts the position signals 48 from an analog signal to a digital signal before being provided to correlation/tracking circuit 50.

In one embodiment, correlation/tracking circuit 50 includes correlator/demodulator 30, PRN code generator 36 and tracking mechanism 34. However, it should be appreciated that the functions of correlator/demodulator 30, PRN code generator 36 and tracking mechanism 34 may be performed by other circuits that do not comprise the correlation/tracking circuit 50. However, for convenience, the following discussion will assume the configuration shown in FIG. 1.

In one embodiment, tracking mechanism 34 performs clock generation, signal tracking and control functions. PRN code generator, based on input from tracking mechanism 34, provides correlator/demodulator 30 with PRN codes which are then used to correlate the received position signals 48 to the receiver locally generated signal. In another embodiment, the position signals 48 from multiple beacons may be processed using parallel hardware channels 1–n, where n represents the total number of position signals 48 and the total number of corresponding hardware channels. In this embodiment, correlation/tracking circuit 50 would be comprised of PRN code generators $36_{1-n}$ and tracking mechanisms $34_{1-n}$.

Controller 46 is part of the CPU system required for most firmware-controlled hardware. DSP subsystem 44 functions as a CPU to control, calculate and schedule operations required for the transmitter and positioning receiver functions, while memory 42 is used by DSP subsystem 44 to execute instructions required for transponder operation. However, it should obviously be appreciated that other processor configurations may be used. In addition, in the embodiment of FIG. 1, controller 46 passes either maximal length codes or Gold codes to PRN code generator 36. Maximal length codes have the property of not repeating until the $2^{n-1}$ clock cycle passes and they have correlation properties defined by an up-slope and down-slope shape. Gold code, on the other hand, can be generated by modulo-two adding two maximal length codes together. While Gold code carries most of the characteristics of the maximal length code, it may have correlation responses besides the main one. These other correlation responses should be smaller than the main response for the codes used in the GPS.

Continuing to refer to FIG. 1, the transmission functionality of transponder 100 will now be described. Transponder antenna 10 may be used to transmit and receive communication signals 52 with other transponders. Given that transponder antenna 10 is capable of two-way communication, T/R switch 12 is used to select between transmit and receive paths. Moreover, as with the position signals 48, a received communication signal 52 may be processed with amp 14 and filter 16. When receipt of the communication signals 52 is desired, switch 8 is set to accept the communication signals 52, which may then be provided to RF downconverter 22. Sharing of RF downconverter 22 is enabled using programmable frequency synthesizer 28, which may itself be shared for both receiving and transmitting functions. While it may be economically desirable to use RF downconverter 22 and ADC 24 for both the position signals 48 and the communication signals 52, it should be appreciated that separate circuits for each may also be employed.

Transponder 100, like most positioning receivers which operate with DSSS signal techniques, uses correlators and PRN code tracking loops for signal de-spreading, synchronization and ultimately sensing the pseudo-range to the navigation system beacon being received on a given channel. The hardware to perform these functions, which in the embodiment of FIG. 1 is performed by correlation/tracking circuit 50, may be suitable for use in transmitter waveform generation. By making use of the reciprocity of the DSSS signal, it is possible to use the same tracking mechanism 34 and PRN code generator 36 for input to a complimentary code keying ("CCK") modulator to generate a transmission signal that another receiver could in turn demodulate. Thus, in the embodiment of FIG. 1 having parallel hardware channels 1–n, tracking mechanisms $34_{1-n}$ and PRN code generators $34_{1-n}$ provide tracking loop and code generation data to CCK modulators $36_{1-n}$ for use in generating transmittable communication signals 52. The number of CCK modulators $36_{1-n}$ may be added as needed up to a maximum number defined by the number of different code generators and tracking mechanisms available. As used herein, received communication signals 52 refers to those signals which are received by the transponder over transponder antenna 10 from other devices. Transmittable communication signals 52 refer to those signals that are generated by the transponder 100 and which are sent to other devices via transponder antenna 10.

As mentioned above, transponder 100 may be used in a navigation beacon positioned network or, alternatively, in a non-navigation beacon relative-positioned network. In the embodiment of the beacon-positioned network, synchronization of the transmittable communication signals 52 to the incoming position signals 48 may be employed. Tracking mechanisms $34_{1-n}$ are used for those applications of the transponder 100 which require synchronization of the transmittable communication signals 52 to the incoming position signals 48 from the navigation system positioning beacon. In the embodiment where synchronization is required between the two systems, tracking loops of tracking mechanisms $34_{1-n}$ that have been in a steady-state tracking mode for positioning would then "flywheel" at the rate of change for positioning and be switched over for the transmission function and then switched back for positioning again. In other embodiments, independent communications devices between positioning and communications would enable simultaneous synchronized operations between the network and positioning system.

However, in applications which use non-beacon relative positioning, a master transmitter in the network may be used to set the basic frequency and phase of the network and the non-master elements (e.g., other transponders 100) would then sample network signals for relative position and also switch to transmit the communication signals 52 when required for data transmission, according to one embodiment.

In yet another embodiment, these transmittable communication signals 52 may also double as ranging signals for the other receivers/transponders. Ranging signals employed by positioning or navigation systems may use several different methods of time tagging the signal for propagation time determination from a transmitter to a positioning receiver. The time tagging enables the receiver to determine the transmit time which is modulated onto the signal by the transmitter and compare the demodulated time tag to the local time reference to determine the time of propagation for the signal. This determined propagation time, scaled by the speed of light, may then be used to determine the range of the transmitter to the receiver. In such a positioning network, the system of known navigation beacon positions at their transmitted signal time tag yields a system of equations involving time, the transmitter positions at time, and the range of the receiver to those transmitter known positions. This system of equations usually has four variables and at least four equations which then can be solved for either a determined or over-determined solution. The variables may include x, y, and z position data, as well as time. By way of providing a non-limiting example, one embodiment of a system of equations with four navigation beacons would be as follows:

$$\sigma_{1,r}^2 = (x_1 - x_r)^2 + (y_1 - y_r)^2 + (z_1 - z_r)^2 + (c \times t_{universal})^2$$

$$\sigma_{2,r}^2 = (x_2 - x_r)^2 + (y_2 - y_r)^2 + (z_2 - z_r)^2 + (c \times t_{universal})^2$$

$$\sigma_{3,r}^2 = (x_3 - x_r)^2 + (y_3 - y_r)^2 + (z_3 - z_r)^2 + (c \times t_{universal})^2$$

$$\sigma_{n,r}^2 = (x_n - x_r)^2 + (y_n - y_r)^2 + (z_n - z_r)^2 + (c \times t_{universal})^2$$

where:

$\sigma_{nr}$=pseudorange of beacon n to receiver based on code phase measurement $x_n$=beacon n coordinate, x axis
$y_n$=beacon n coordinate, y axis
$z_n$=beacon n coordinate, z axis
c=speed of light
$t_{localuniversal}$=best fit solved for universal time based upon best position fix result This system of equations may be used to enable a best-fit solution of receiver position and time based upon received signal phase from four navigation beacon signals.

In navigation systems where the positioning receiver can calculate position, it may be preferable for there to be some receiver knowledge of each of the navigation beacon's position and knowledge of the "universal time" of the transmitted navigation beacon signals. In cases where those navigation beacon positions are not known, it may be desirable to convey the navigation beacon transmitter time-position to the receiver. To that end, in one embodiment such data may be encoded onto the navigation beacon transmitter signal, thereby enabling the receiver to demodulate the information and use it in the position calculation.

In one embodiment, a navigation beacon signal construct that adheres to the description above may utilize a CCK BPSK ("Bi-Phase Shift Keying") signal that has temporal properties useful for ranging measurements, while also enabling data modulation. In one embodiment, such a CCK BPSK signal may be described mathematically as:

$S_{beaconID}(t, prncode_{ID}(t), message_{ID}(t)) = \cos(\omega_{c,ID}*t + \pi/2*message_{ID}(t)*prncode_{ID})$ where the signal $S_{beaconID}(t, prncode_{ID}(t), message_{ID}(t))$ consists of:

a function of time, t;
the PRN sequence, which may also fuction as the beacon ID, $prncode_{ID} \in \{-1,1\}$;
a carrier wave, $\cos(\omega_{c,ID}*t)$ with the angular carrier frequency associated with that particular beacon and therefore the associated beacon ID; and
a data message, $message_{ID}(t) \in \{-1,1\}$, which represents a time mark definition and the time-position function of the beacon that sent it.

Given that the PRN code has a cycle associated with the universal time used by the navigation beacon network, and that the data message contains information about the universal time and positions of the beacons, in one embodiment the receiver would be able to extract sufficient information to calculate its own position.

The data message and the PRN code may both have binary properties and have values for this argument of "1" or "−1". It is also possible to alter that PRN through a process known as CCK, which is a modulation wherein a PRN sequence is inverted when the message bit is a "logical 1" and not inverted when it is a "logical 0". In order to mathematically represent this process, the data message and the PRN are considered as bi-polar signals; namely +1 and −1 for logical 1 and logical 0, respectively. As the BPSK process involves inversion of the signal carrier for a "logical 0" and a pass-through for a logical 1, a multiplication of the carrier wave by the bi-polar representation will produce a BPSK modulation.

A local representation of the received CCK BPSK code may be produced in the receiver in order to enable detection of the transmitted signal and to demodulate any message that would be encoded upon it. In one embodiment, the receiver can synchronize the local PRN to the PRN modulation riding on the transmitted signal. This is accomplished through the correlation properties of the PRN, which are at a maximum (a normalized +1) for correlation of like-PRN sequences which have the same "polarity sense" and which are in phase with each other. Similarly, the correlation properties of the PRN are at a negative maximum (a normalized −1) for correlation of like-PRN sequences which have the opposite "polarity sense" and which are in phase with each other.

In one embodiment, each PRN sequence has a length after which the PRN repeats itself. This length, which may be referred to as the "PRN cyclicity", may also help to define the correlation response to a PRN sequence that is unsynchronized with respect to a PRN replica that is locally generated. For maximal length PRN sequences, the unsynchronized response may reduce to the normalized level of the value defined as "polarity sense*(−1 /(code length))," where the polarity sense is +1 or −1 when the two sequences are unsynchronized by one or more PRN clock periods.

As a result, the correlation response between the received PRN and the locally-generated PRN can be used as a measurement of synchronization by having a triangular response in delay space with the maximum correlation excursion occurring when the two are synchronized. To that end, in one embodiment, PRN synchronization uses these principles with a hypothesis-test loop where the locally-generated PRN is multiplied with the receive signal and the response is measured. The phase of the locally-generated PRN may be adjusted and the multiplication measurement response evaluated until an acceptable multiplication response level is attained. As the response is a triangular function in synchronization space, any loss of synchronization will result in a loss of correlation from the multiplication process and can be used to correct the PRN clock rate and/or PRN phase to maintain the maximum level of synchronization.

In order to detect advanced or retarded local PRN phase, two or more multipliers may be used with a fraction of a PRN clock cycle signal delay between them (e.g., ½ or ¼ the PRN clock *cycle*). In such a *case*, when the local code was advanced the advanced or "*early*" correlator would increase in *response*, and the "*late*" correlator would decrease in *response. Conversely*, when the local code was retarded from the receive signal the "*early*" correlator would decrease in *response*, and the "*late*" correlator would increase in *response*. T*hus*, an "*early response-late response*" term may be used to provide a feedback control signal which could be used to retard or advance the locally generated PRN replica rate towards maintaining receiver *synchronization. T*his delay lock loop (DLL) technique may operate via controlling the locally generated PRN rate such that the received signal PRN phase is maintained between the early and late *correlators*, where an equal response for both may indicate the best possible *synchronization*.

Through the properties of a bi-polar multiply, it is also possible to demodulate the data from the received signal by multiplying it with a locally generated replica signal consisting of locally-reproduced carrier wave multiplied with PRN. In another embodiment, the above described early and/or late correlator outputs may also be used for this second purpose. The local code phase, which is known by virtue of being synchronized with the received signal through the above described DLL process, may also provide the code phase measurement necessary for ranging from the receiver to each of the respective navigation beacons.

In one embodiment, there may be an error rate above which the desired position information can no longer be extracted. Given that the desired position information is used to calculate position, this may cause a positioning sensitivity limitation. The code phase may be measured with an almost arbitrary level of sensitivity given sufficient local oscillator stability, sufficiently narrow bandwidths, sufficiently long integration times, etc. It is possible to "assist" such a positioning receiver with information that would normally be sent with the data message via some other communications link. For example, it is possible to send over a separate communications link the range of code phases expected at the receiver position, the frequency of the navigation beacon signal, the identifications (and PRN sequences therefore) of the navigation beacons, etc. This would be useful in reducing the amount of time it takes a receiver to measure the code phase since the narrow bandwidths necessary for weak navigation signal detection require a proportionately longer measurement period. Furthermore, because the bandwidths are narrow, the number of search attempts is increased with an indeterminate frequency of the signal.

While the information needed to perform these assistance functions may be sent as explicit data over the communications link, in one embodiment this information is implicit in the communication signal in question. That is, the PRN code cycle used by a transponder signal is related to the navigation beacon signal PRN code cycle such that a receiver of the communications signal would have the PRN code timing of the "companion" navigation signal it is associated with. This is a form of code phase assistance that is implicit in the signal, rather than an explicit data representation of that code phase assistance. Likewise, the transponder communications signal frequency is deterministically related to the associated "companion" navigation signal. Therefore, timing information would be part of the communications data message and would identify the universal time associated with the next code phase cycle commencement.

After controller 46 provides transmission data 62 to the CCK modulators 36$_{1-n}$, PRN code data 56 and correlator data 54 for a given channel n may be combined and summed by summers 38 for channels 1–n to provide a CCK signal 64. Thereafter, the CCK signal 64 may be up-converted in order to change the basic CCK signal 64 frequency to the desired frequency of the transmittable communication signals 52. In the embodiment of FIG. 1, this is accomplished with the programmable frequency synthesizer 28 which provides the required frequency to up-convert to the frequency of the transmittable communication signals 52. The use of the programmable frequency synthesizer 28 for both the up-converter 26 and RF down-converter 22 follows from the fact that the up-conversion and down-conversion processes are reciprocal processes. A transmittable communication signal 52 may be processed by amp 66 and filer 68 before being transmitted via transponder antenna 10.

Moreover, transponder 100 has been shown with two separate antennae because it is likely that any transmitted communication signals 52 would be much larger in amplitude than the position signals 48, which may interfere with positioning receiver operation. Also, some navigation beacon systems are "radio transmission" protected to prevent emissions, intentional or unintentional, from interfering with the navigation signals which may be small in amplitude. Because of this protection against emissions, it may be desirable to choose other sanctioned frequencies for the communications function of the positioning network transponders. However, absent these factors, it should be appreciated that the position signals 48 and communication signals 52 may be received on the same antenna.

Figure 2A:
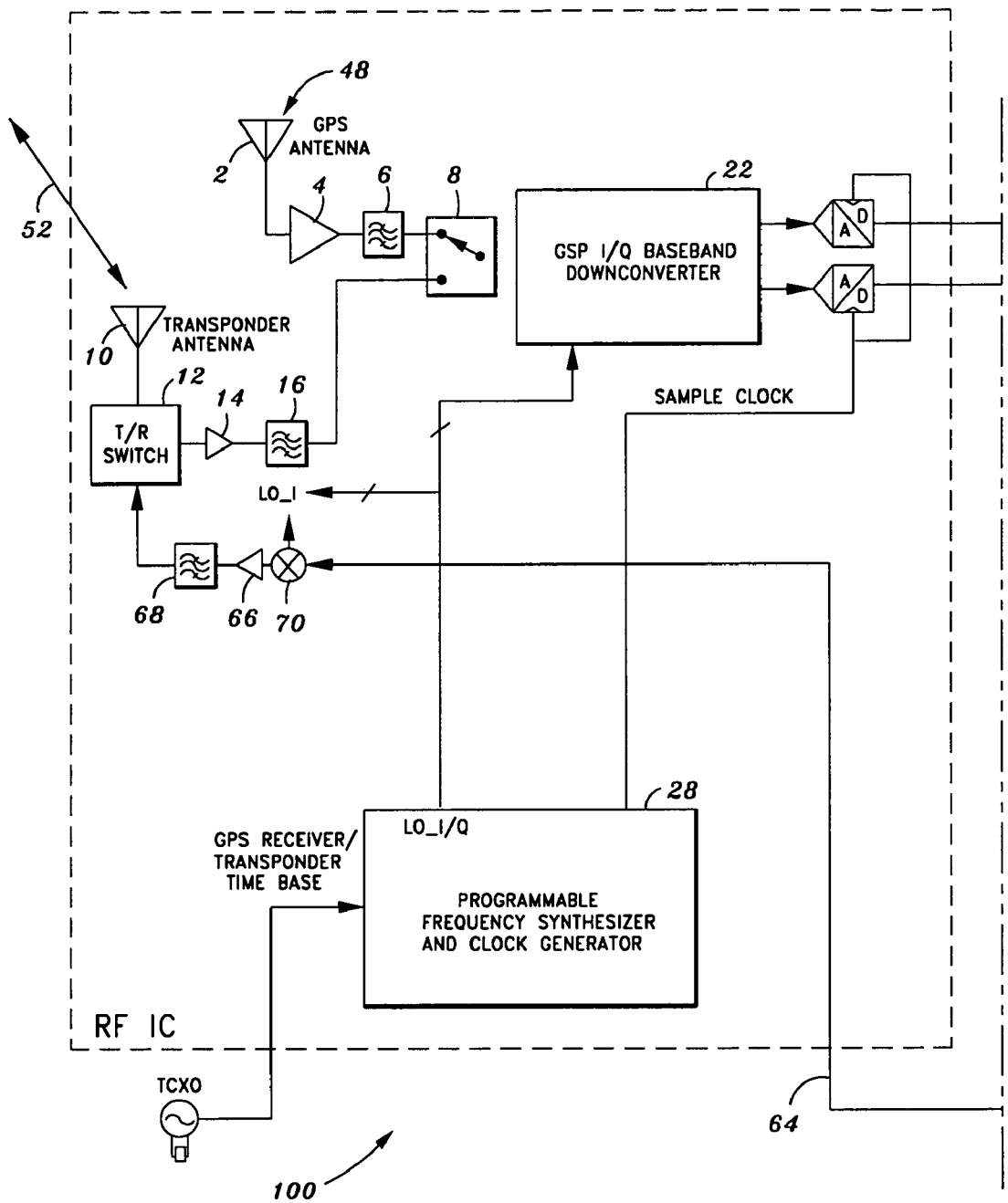
FIG. 2a is a schematic diagram of another embodiment of a transponder consistent with the principles of the invention.
Figure 2A:
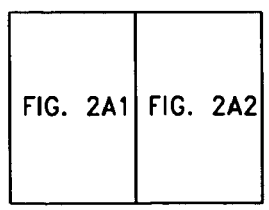

Referring now to FIG. 2a, another embodiment of transmitter 100 is depicted showing additional detail of correlation/tracking circuit 50. Moreover, in this single-data-channel embodiment, up-converter 26 is replaced with RF mixer 70, which operates in conjunction with XOR gate 75 and universal synchronous transmitter 80, as depicted in FIG. 2a. In particular, PRN code data 56 is provided to universal synchronous transmitter 80 and correlator data 54 is provided to XOR gate 75. Thereafter, using the output of the universal synchronous transmitter 80 and the correlator data 54, the XOR gate 75 generates the CCK signal 64, according to one embodiment. In this embodiment, rather than use up-converter 26, the transmittable communication signal 52 is generated by direct conversion using binary phase shift keying (BPSK) in the RF mixer 70 via multiplication of the CCK signal 64 (provided by the XOR gate 75) with the local oscillator generated by the programmable frequency synthesizer 28.

FIG. 2b depicts a multi-channel embodiment of transponder 100 that includes a complex mixer for single-sideband up-conversion of the I and Q summed BPSK-CCK signals to a BPSK-CCK signal at the RF carrier frequency. In this embodiment, communication bandwidth is maximized by having a communications channel associated with and sharing hardware and software.

It should be appreciated that one of more of the components comprising transponder 100 may be implemented as integrated circuit(s), firmware and even software. Moreover, one or more of the components comprising transponder 100 may be implemented by the chipsets marketed under the tradename of u-Nav Microelectronics Corporation, such as those chipsets having model number designations of uN8021B and uN8031B. The principles of the invention may also be implemented by modifying the chipsets marketed under the tradename of u-Nav Microelectronics Corporation, such as those chipsets having model number designations of uN8021B and uN8031B.

Figure 3A:
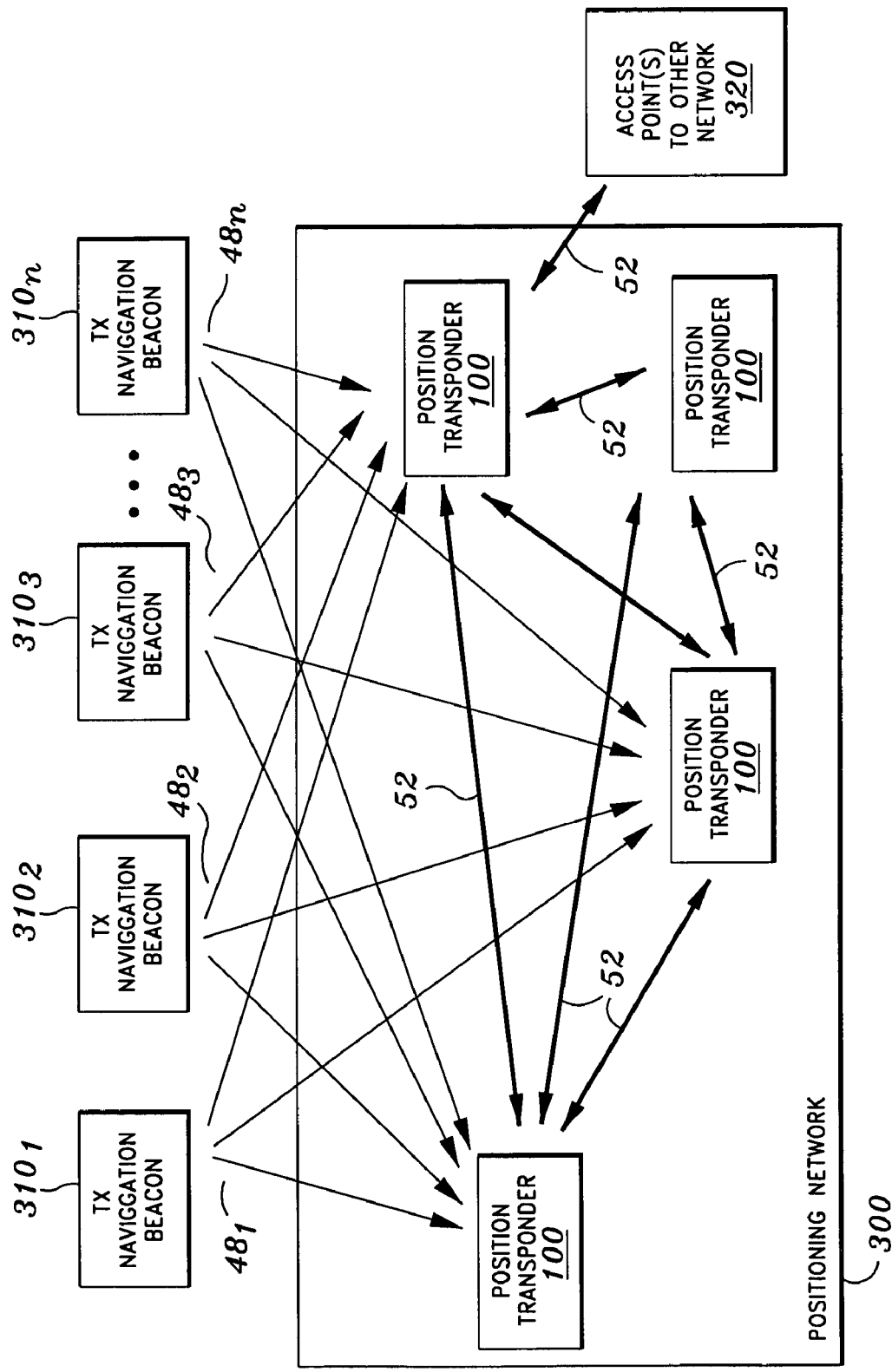
FIG. 3a illustrates the simplified configuration and node interaction of a network, according to one embodiment.

Referring now to FIG. 3a, in which a network consistent with the principles of the invention is depicted. In particular, positioning network 300 is shown comprised of a number of transponders 100 that are able to communicate with each other via communication signals 52, where such signals may include data, position information, network topology and/or commands. In addition, positioning network 300 (and each node therein) can communicate with other networks 320. Moreover, in the embodiment of FIG. 3a, positioning network 300 receives position signals 48$_{1-n}$ from navigation beacons 310$_{1-n}$, which in one embodiment are DSSS satellite systems.

As mentioned previously, one aspect of the invention is to have network nodes that are addressable by physical characteristics. Thus, in the embodiment of FIG. 3a, the nodes of positioning network 300 are the transponders 100, which may each have knowledge of the network physical topology via communication signals 52. In one embodiment, the node-level knowledge is maintained on a real-time basis. In another embodiment, the addressability of the nodes (e.g., transponders 100) is based upon physical quantities of either relative or absolute location, velocity or any combination thereof. Node identification can also be incorporated into the addressing scheme where each transponder 100 has its own device ID.

As previously mentioned, one application of having spatially addressable network nodes is the ability to define a method for secure communication. To that end, in one embodiment, communication signals 48 may be secure communications, encrypted with position authentication. In another embodiment, communication signals 48 may be spatially encoded accessible only at a desired position. A spatially encoded signal could be demodulated only by a receiver at the proper position. In one embodiment, this scheme could be utilized in "range-gated" communications in LPD applications and for spatially selectable communications and control functions. Similarly, other signal qualities may be used to enable a PVT calculation to be made and used in an encryption scheme. Any combination of PVT outputs, or even raw receiver data (e.g., code phase, etc.) could be used as a means of selecting intended recipients.

In another embodiment of spatial addressing, the positioning network could provide the necessary components to the desired signal from separate sources. By way of example, in a three-source case, if necessary information were available only if signal X at range of WX were combined with signal Y at range WY and with signal Z at range WZ, only one point would provide the ability to receive and combine the three signals with the proper relationships for extraction of the desired information.

In yet another embodiment, positioning network 300 is a self-configuring network. In particular, new transponders 100 can join the positioning network by protocol sharing, according to one embodiment. Due to the self-configuration properties and distributed storage capabilities of positioning network 300, data relay becomes possible where network nodes (e.g., transponders 100) that cannot communicate directly, can pass data to each other through interstitial nodes. By use of this data-relay function, any node that receives position signals 48 of suitable quality for position fixing can pass the necessary data to the rest of the network nodes that may be located in weak-position-signal conditions. Thus, one aspect of the present invention is to provide location capability for transponders 100 in weak-signal environments.

With respect to populating the network with network topology data, relative positioning of network nodes is possible where nodes calculate position data from communication signals 52 that are received. The transmitting nodes on the network would have position knowledge, either absolute or relative, and the triangulation techniques used commonly in navigation positioning receivers would operate in the same way on the network transponder frequencies. Moreover, since all of nodes will have position signals 48 or communication signals 52 or both, it is possible for all nodes to be co-synchronized to each other. Thus, if position signals 48 are available to any node of the network, network synchronization to the navigation beacon 310 system is possible.

In yet another embodiment, VLBI (Very Long Baseline Interferometry) measurements are facilitated without the need for additional hardware. VLBI techniques are typically used in some high-accuracy positioning systems and involve the combination of the positioning data from two or more receivers for the position calculation process. The required data may be passed over the positioning network 300 between the nodes, which in the embodiment of FIG. 3*a* are the transponders 100. The use of positioning system time base may be used as a frequency reference for any systems combining other functions requiring precise frequency reference.

As previously mentioned, one aspect of the invention relates to network assisted positioning in which a communications link provides information to assist a positioning receiver in acquiring the navigation signal. In this fashion, sensitivity and acquisition times of positioning receivers can be improved. In one embodiment, this is accomplished by having the communications signals carry implicitly in their characteristics (e.g., frequency, ranging code phase, etc.) a known relationship to the associated navigation signal desired for acquisition. It is noteworthy that using these signal characteristics in this fashion enables position assistance functionality to be performed without using data representations of frequencies, code phases, and beacon PRN sequences. Relative positioning is also possible using triangulation techniques and communications signals for ranging measurements. In another embodiment, a communications channel may augment the navigation beacon 310 position signals 48.

Figure 3B:
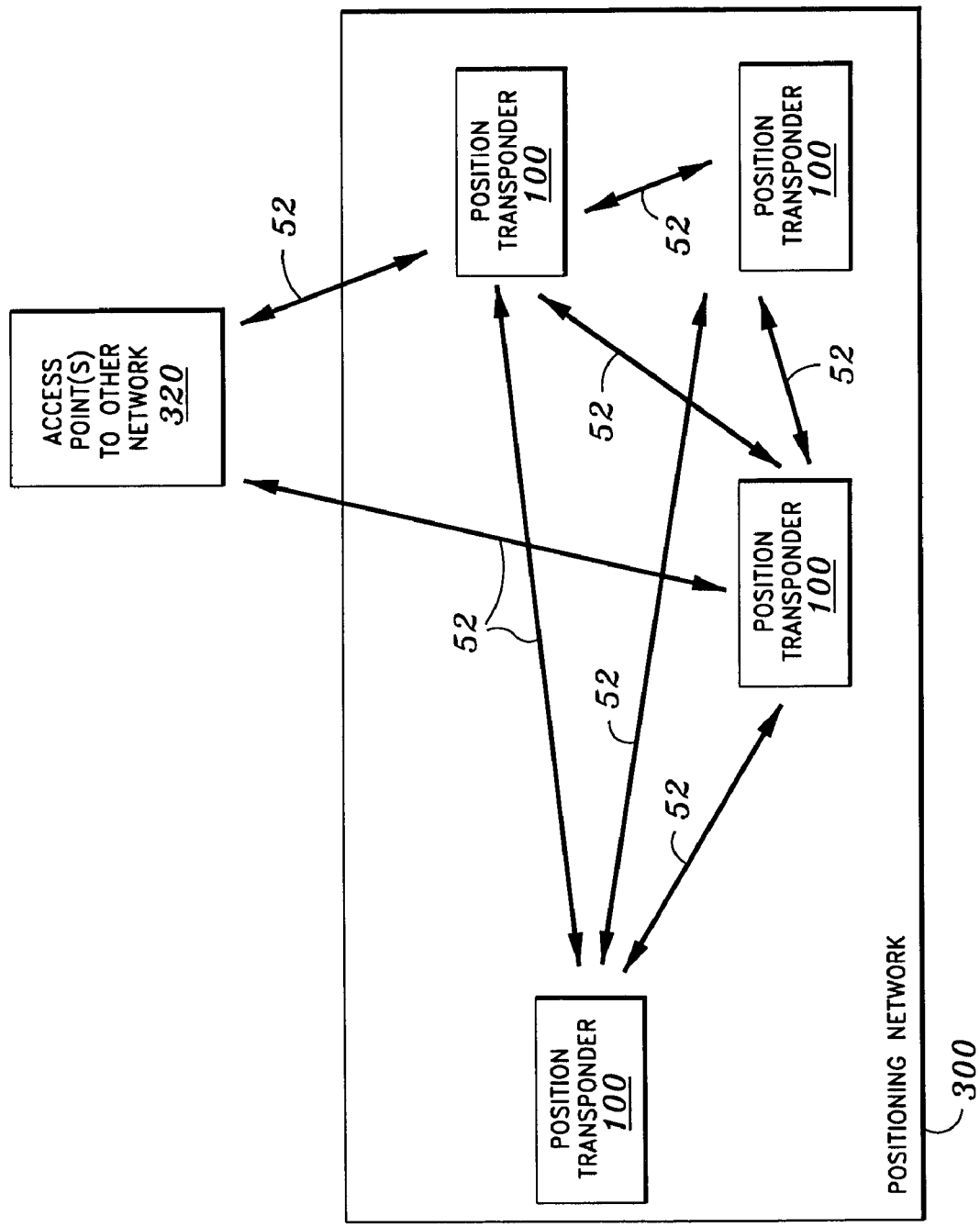
FIG. 3b illustrates the configuration and node interaction of a network, according to another embodiment.

In the embodiment of FIG. 3*b*, no navigation beacons 310 are used. Rather, transponders 100 exchange positioning information as was described above with respect to FIG. 3*a*, but on a relative basis. Similarly, network topology data is maintained on a relative basis. Thus, the positioning network 300 has knowledge of relative positions between the communicating network nodes (position transponders 100) by mutual triangulation of the system of signals passing between the nodes (e.g., communication signals 52). If at least one absolute position is known, the entire network is position self-aware.

Figure 4A:
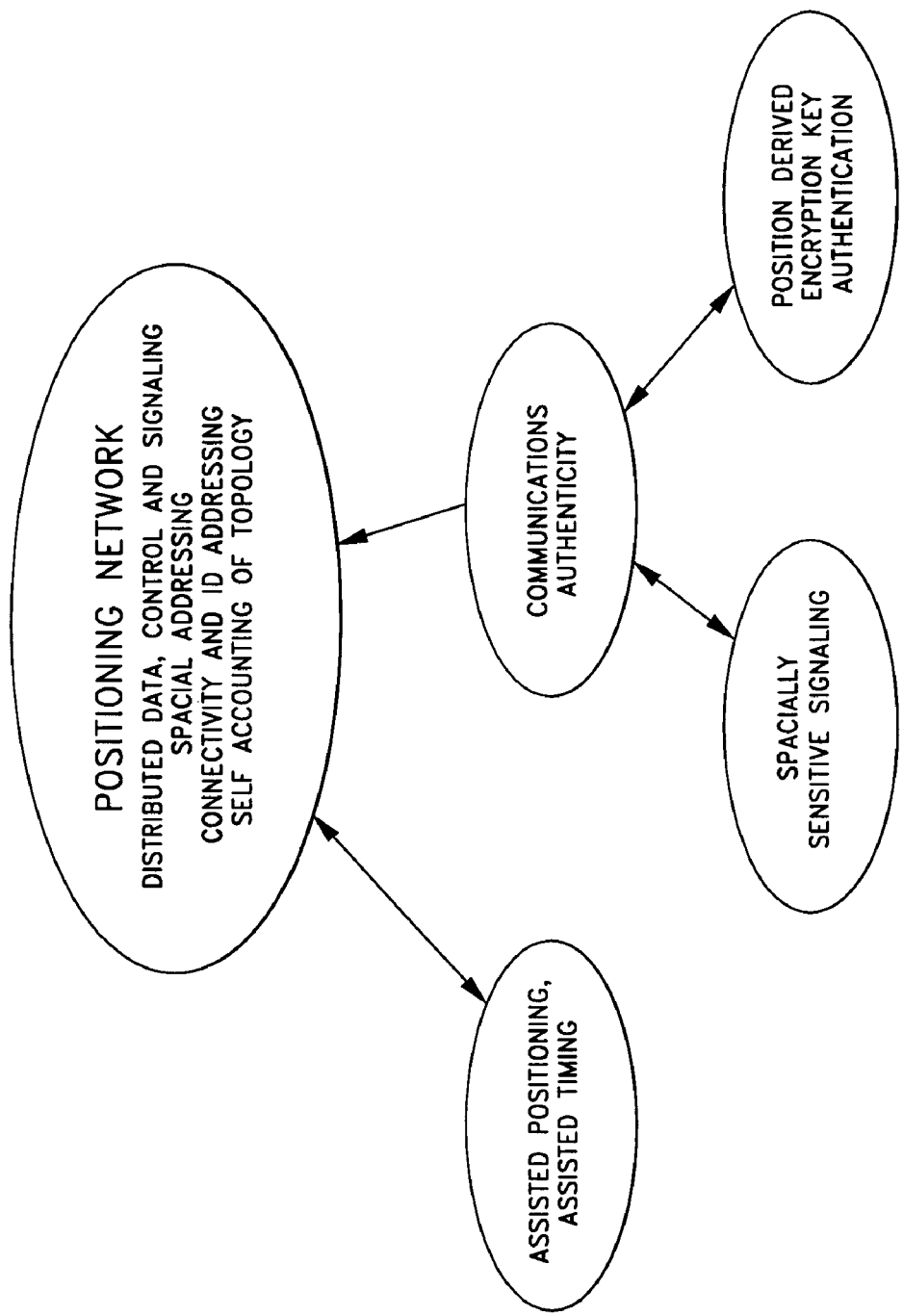
FIG. 4a depicts one embodiment of the functionality of a network consistent with the invention.
Figure 4B:
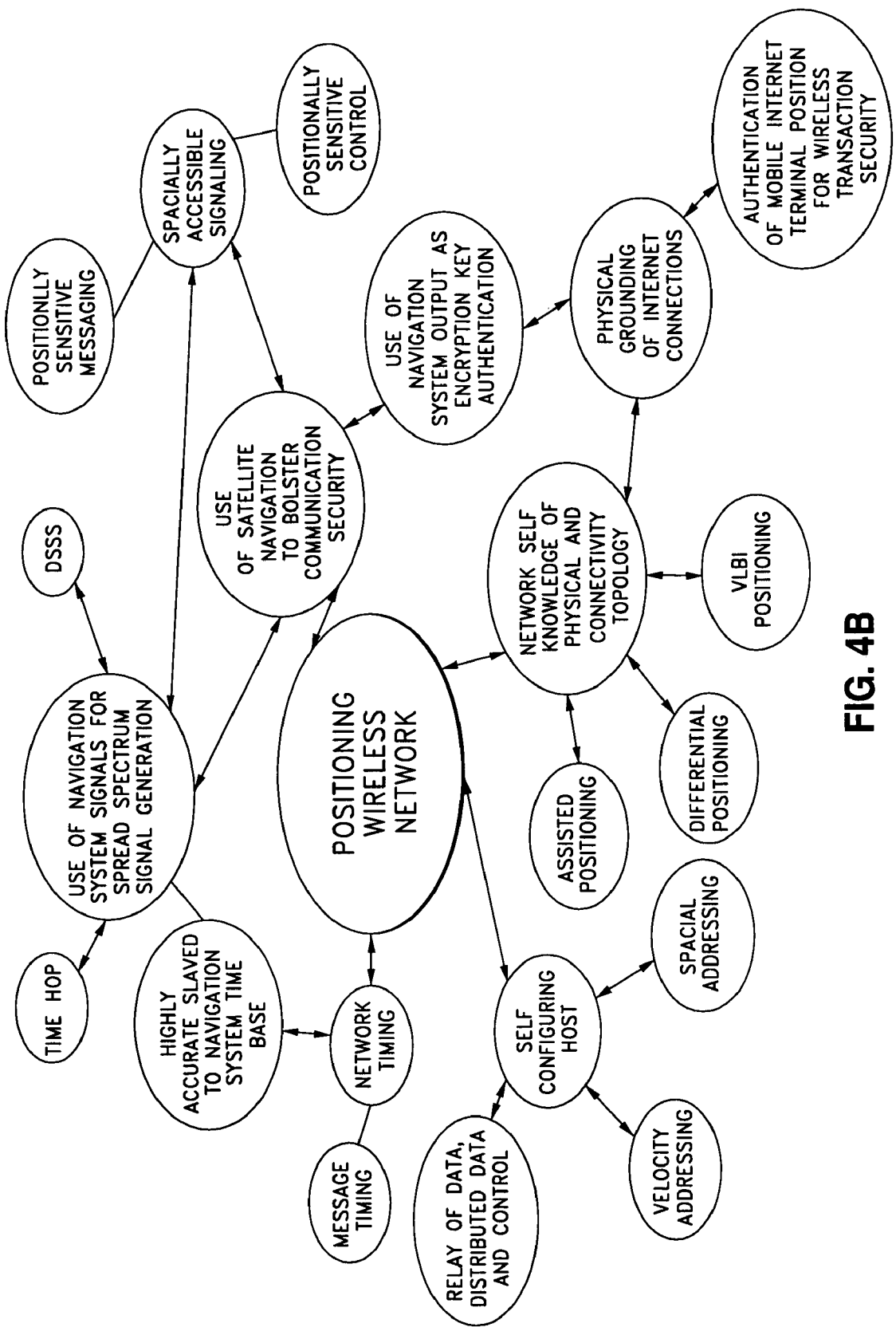
FIG. 4b depicts another embodiment of the functionality of a network consistent with the invention.

FIG. 4*a* depicts a simplified functionality diagram of a positioning network 300 consistent with the principles of the invention. FIG. 4*b* is a more detailed functionality diagram of positioning network 300 showing numerous embodiments of the functions enabled by the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A network comprising: a first network node; and,
a second network node to wirelessly communication with said first network node, wherein said first network node securely transmits communication signals to said second network node using one or more spatial parameters unique to said second network node, wherein
said one or more spatial parameters include at least one of a position parameter and a velocity parameter,
said communication signals are decodable by said second network node only when said one or more spatial parameters match a corresponding spatial characteristic of said second network node,
said communication signals sent from said first network node to said second network node are encrypted using said one or more spatial parameters, and wherein
said communication signals may be decrypted by said second network node using one or more corresponding spatial characteristics of said second network node.

2. The network of claim 1, wherein a position, velocity, time (PVT) calculation is used to encrypt said communication signals.

3. The network of claim 1, wherein said PVT calculation is used to generate a new signal that can only be demodulated by a recipient node that is located in an intended position.

4. The network of claim 1, wherein said communication signals include non-position data and relative position information.

5. The network of claim 1, further comprising a master transmitter that sets the basic frequency and phase of said network and said first and second network nodes.

6. The network of claim 1, further comprising a plurality of navigation beacons which transmit position signals to said first and second network nodes, and wherein said first and second network nodes are position transponders.

7. The network of claim 6, wherein said communication signals are synchronized to said position signals.

8. The network of claim 6, wherein said communication signals are used as ranging signals for other network nodes, said other network nodes to determine signal propagation time using signal time tagging.

9. The network of claim 6, wherein said position signals are usable for determining absolute positioning information for said first and second network nodes.

10. The network of claim 9, wherein said communication signals include non-position data and absolute position information.

11. The network of claim 6, wherein said communication signals substitute for said position signals in determining network node position information.

12. The network of claim 11, wherein said communication signals are used to provide frequency and signal phase assistance in the determination of node position information.

13. The network of claim 12, wherein said frequency and signal phase assistance is used by said first network node to detect attenuated positioning signals from said plurality of navigation beacons.

14. A positioning device coupled to a network, comprising:
- a receiver portion;
- a transmitter portion;
- a processor coupled to the receiver portion and transmitter portion; and
- a memory coupled to the processor to store one or more instruction sequences, said instruction sequences to cause the positioning device to communicate wirelessly with a second positioning device by securely transmitting communication signals to said second positioning device using one or more spatial parameters unique to said second network node, wherein
- said one or more spatial parameters include at least one of a position parameter and a velocity parameter,
- said communication signals are decodable by said second positioning device only when said one or more spatial parameters match a corresponding spatial characteristic of said second positioning device,
- said communication signals are decodable by said second positioning device only when said one or more spatial parameters match a corresponding spatial characteristic of said second positioning device.

15. The positioning device of claim 14, wherein a position, velocity, time (PVT) calculation is used to encrypt said communication signals.

16. The positioning device of claim 15, wherein said PVT calculation is used to generate a new signal that can only be demodulated by a recipient node that is located in an intended position.

17. The positioning device of claim 14, wherein said communication signals include non-position data and relative position information.

18. The positioning device of claim 14, further comprising a master transmitter that sets the basic frequency and phase of said network and said positioning device and second positioning device.

19. The positioning device of claim 14, further comprising a plurality of navigation beacons which transmit position signals to said positioning device and second positioning device, and wherein said positioning device and second positioning device are position transponders.

20. The positioning device of claim 19, wherein said communication signals are synchronized to said position signals.

21. The positioning device of claim 19, wherein said communication signals are used as ranging signals for other positioning devices, said other positioning devices to determine signal propagation time using signal time tagging.

22. The positioning device of claim 19, wherein said position signals are usable for determining absolute positioning information for said positioning device and second positioning device.

23. The positioning device of claim 22, wherein said communication signals include non-position data and absolute position information.

24. The positioning device of claim 19, wherein said communication signals substitute for said position signals in determining position information.

25. The positioning device of claim 23, wherein said communication signals are used to provide frequency and signal phase assistance in the determination of position information.

26. The positioning device of claim 25, wherein said frequency and signal phase assistance is used by said positioning device to detect attenuated positioning signals from said plurality of navigation beacons.

27. A method comprising:
- encoding communication signals using one or more spatial parameters unique to a second network node;
- transmitting said communication signals from a first network node to the second network node, said first and second network nodes to comprise a wireless network;
- receiving said communication signals by said second network node; and
- decoding said communication signals by said second network node when said one or more spatial parameters match a corresponding spatial characteristic of said second network node, wherein
- said one or more spatial parameters include at least one of a position parameter and a velocity parameter,
- comprising encoding said communication signals using a position, velocity, time (PVT) calculation,
- generating a new signal using said PVT calculation, where said new signal can only be demodulated by a recipient node that is located in an intended position.

28. The method of claim 27, wherein said communication signals include non-position data and relative position information.

29. The method of claim 27, further comprising setting the basic frequency and phase of said network and said first and second network nodes using a master transmitter.

30. The method of claim 27, further comprising transmitting position signals from a plurality of navigation beacons to said first and second network nodes where said first and second network nodes are position transponders.

31. The method of claim 30, wherein said communication signals are synchronized to said position signals.

32. The method of claim 30, further comprising using said communication signals as ranging signals for other network nodes, said other network nodes to determine signal propagation time using signal time tagging.

33. The method of claim 30, further comprising using said position signals to determine absolute positioning information for said first and second network nodes.

34. The method of claim 33, wherein said communication signals include non-position data and absolute position information.

35. The method of claim 30, wherein said communication signals substitute for said position signals in determining position information.

36. The method of claim 34, further comprising using said communication signals to provide frequency and signal phase assistance in the determination of position information.

37. The method of claim 36, using said frequency and signal phase assistance by said first network node to detect attenuated positioning signals from said plurality of navigation beacons.

* * * * *